THREE-LEVEL BINARY CODE TRANSMISSION

Filed Nov. 23, 1959 3 Sheets-Sheet 1

INVENTOR
M. KARNAUGH
BY R. B. Ardis
ATTORNEY

THREE-LEVEL BINARY CODE TRANSMISSION

Filed Nov. 23, 1959 3 Sheets-Sheet 2

INVENTOR
M. KARNAUGH
BY R. B. Ardis
ATTORNEY

INVENTOR
M. KARNAUGH
BY R. B. Ardis
ATTORNEY

United States Patent Office 3,214,749
Patented Oct. 26, 1965

3,214,749

THREE-LEVEL BINARY CODE TRANSMISSION

Maurice Karnaugh, Warren Township, Somerset County, N.J., assignor to Bell Telephone Laboratories, Incorporated, New York, N.Y., a corporation of New York Filed Nov. 23, 1959, Ser. No. 854,820
4 Claims. (Cl. 340—347)

This invention relates generally to the transmission of information by pulse techniques and more particularly-although in its broader aspects not exclusively, to transmission by pulse code techniques based upon a two-level or binary code.

In the past, one difficulty with transmission of a conventional binary code train in a pulse code modulation or PCM system has been that such a pulse train possesses a direct-current component which creates restoration problems in systems employing transformers and coupling capacitors. Several schemes have been devised for converting an ordinary unipolar binary code train into a bipolar pseudo-ternary code train having no component at zero frequency. One of these is disclosed in United States Patent 2,759,047, which issued August 14, 1956, to L. A. Meacham. Another is disclosed in United States Patent 2,996,578, which issued August 15, 1961, to F. T. Andrews, Jr. In both, oppositely poled pulses appear alternately to provide a null in the power density spectrum of the pulse train at zero frequency. Problems of direct-current restoration are thus substantially eliminated.

An important advantage of both bipolar pulse conversion schemes is that the resulting power density spectrum also contains a null at the basic pulse repetition frequency, sometimes known as the bit rate. As pointed out in the Andrews patent, advantage may be taken of this null by superimposing a steady wave of that frequency upon the transmited bipolar pulse train. Such a wave can be recovered with a minimum of filtering difficulty at each repeater point and used to reduce so-called jitter by accurately timing the regeneration of each transmitted pulse.

Under some circumstances, unfortunately, addition of a timing wave at a frequency as high as the bit rate can result in a troublesome degree of timing crosswalk between adjacent lines. Since adjacent PCM lines are seldom in perfect phase synchronism, serious errors can be introduced at repeater points if any substantial amount of energy at the timing frequency is received by crosstalk from other lines. Such crosstalk could be reduced markedly by reducing the timing frequency to some submultiple of the bit rate, but existing bipolar pulse transmission schemes provide no nulls in the power density spectrum at such frequencies.

A principal object of the present invention, therefore, is to reduce timing crosstalk between adjacent lines in a binary type pulse transmission system without introducing difficult filtering problems.

Another and more particular object is to permit a timing wave to be added to the transmitted wave in such a system at a submultiple of the bit rate without introducing difficult filtering problems.

A closely related object of the invention is to introduce a null into the power density spectrum of a binary code pulse train at a submultiple of the bit rate.

Still another object is to provide greater versatility than that afforded by the prior art in shaping the power density of a binary code pulse train.

The present invention permits both realization of these objects and retention of the advantages of the prior art represented by the disclosures of the above-identified Meacham and Andrews patents. In accordance with the present invention, a null is obtained in the power density spectrum of a binary code train at any desired submultiple of the bit rate by routing the contents of consecutive time slots of the binary code train into a plurality of different conversion channels in sequence, inverting the polarity of alternate marks or ON pulses in each channel, and recombining the marks or ON pulses and the spaces or OFF pulses from all channels in their original sequence. The resulting pulse train is a pseudo-ternary or three-level train having a null not only at zero frequency but also at a submultiple of the bit rate dependent upon the number of conversion channels employed. The original binary code train is recovered from the pseudo-ternary train by simple full-wave rectification.

Since the present invention retains the null at zero frequency afforded by Meacham and Andrews, problems of direct-current restoration are still avoided. The present invention provides a null at a submultiple of the bit rate, however, and a steady timing wave can be added at that frequency to reduced jitter without introducing unduly stringent filtering requirements. A substantial decrease in timing crosstalk between adjacent lines results.

A more complete understanding of the invention may be obtained from a study of the following detailed description of several specific embodiments. In the drawings.

Figure 1:
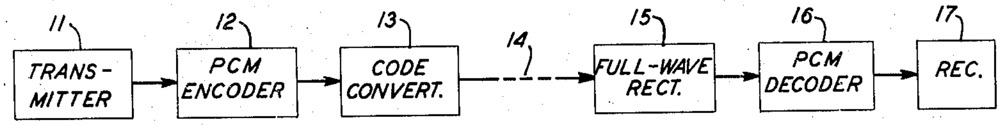
FIG. 1 is a block diagram showing the general outline of a PCM system employing the invention.

A PCM system in which the present invention finds ready application is shown in block diagram form in FIG. 1. There, a transmitter 11 supplies signal amplitude samples containing the intelligence to be transmitted to a PCM encoder 12. Encoder 12 converts the signal amplitude samples to unipolar code groups of ON and OFF pulses in conventional two-level binary code form and supplies them to a code converter 13. Code converter 13, which may take the form of the circuits illustrated in FIGS. 2 and 5, alters the power density spectrum of the pulse train by producing a pseudo-ternary or three-level code train for transmission over transmission medium 14. This three-level pulse train is a pseudo-ternary code train in that, while its appearance is that of a ternary code train, the significance of its pulses remains that of the original binary code train received from encoder 12. At the other end of transmission medium 14, the three-level train is received by a suitable code restorer 15 which is, in accordance with an important feature of the invention, simply a full-wave rectifier. Rectifier 15 restores the pulse train to its original unipolar binary code form and supplies it to a PCM decoder 16. Decoder 16 converts each code group to an equivalent signal amplitude sample which is, in turn, transmitted to a receiver 17 for utilization.

Figure 2:
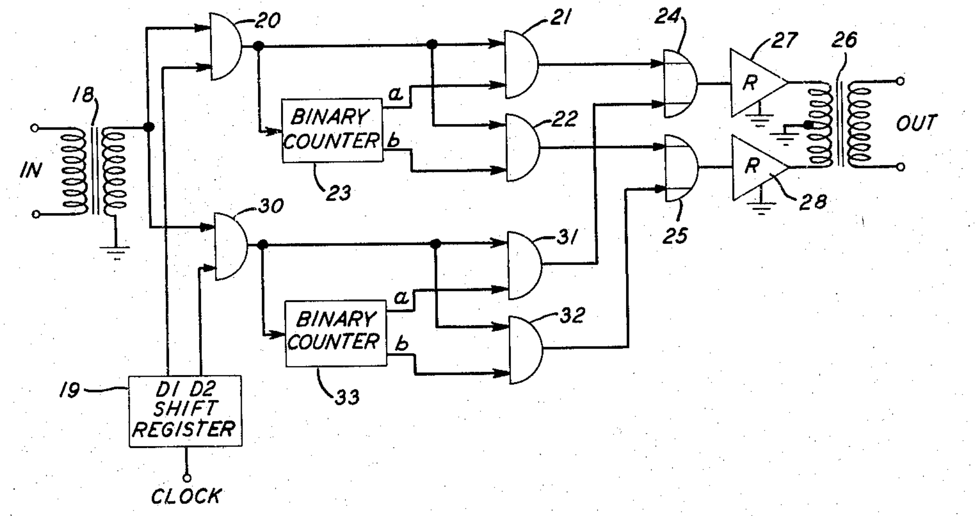
FIG. 2 illustrates a two-channel code converter embodying the present invention.

The code converter illustrated in FIG. 2 makes use of the principles of the invention by routing the contents of consecutive time slots of the binary code train into two separate conversion channels in alternation. Conventional unipolar binary code groups of marks or ON pulses and spaces or OFF pulses are received from the system encoder by an input transformer 18. Routing is accomplished by a two-stage shift register 19 in combination with a pair of AND gates 20 and 30. Each AND gate has a pair of input leads and energizes its single output lead only when both input leads are energized simultaneously. Each AND gate is represented in the drawings by a semicircle in which the input leads extend only to the chord. One input lead of each AND gate receives pulses from input transformer 18 while the other receives timing pulses from the appropriate output terminal of shift register 19.

Shift register 19 has two output terminals, labeled D1 and D2 respectively, and is driven at the bit rate by a regular succession of clock pulses. It supplies a mark or ON pulse at the D1 terminal during every odd-numbered time slot and a similar mark or ON pulse at the D2 terminal during every even-numbered time slot. The ON pulses at the D1 terminal are supplied to AND gate 20, while those at the D2 terminal are supplied to AND gate 30. As a result, the contents of each odd-numbered time slot of the received binary code train are routed to the channel controlled by AND gate 20, while those of each ever-numbered time slot are routed to the channel controlled by AND gate 30. As an alternative, a simple binary counter may be used instead of shift register 19.

In accordance with an important feature of the invention, selected marks or ON pulses in each conversion channel in FIG. 1 are inverted in polarity. This is accomplished in the odd channel by a pair of AND gates 21 and 22 and a binary counter 23, and in the even channel by a pair of AND gates 31 and 32 and a binary counter 33. Since the construction and operating principles of the two channels are identical, only the odd channel will be described in detail. In that channel, the output of AND gate 20 is supplied directly to one input lead each of AND gates 21 and 22. The output of AND gate 20 also drives binary counter 23. The latter device has a pair of output terminals, labeled *a* and *b*, which are opposite to one another in state at all times. Terminal *a* is connected to AND gate 21, while terminal *b* is connected to AND gate 22.

The two conversion channels in the embodiment of the invention illustrated in FIG. 2 are combined with the aid of a pair of OR gates 24 and 25 and an output transformer 26. Each OR gate has a pair of input leads and energizes its single output lead whenever either input lead is energized. Each OR gate is represented in the drawings by a semicircle in which the input leads extend through the chord to the arc. OR gate 24 is energized by one AND gate for each channel, namely, AND gate 21 for the odd channel and AND gate 31 for the even channel. A first regenerative pulse amplifier 27 is connected between the output terminal of OR gate 24 and one end of the primary winding of output transformer 26 to provide sharply defined ON pulses of standard amplitude in response to each applied ON pulse. A second regenerative pulse amplifier 28 is similarly connected between the output terminal of OR gate 25 and the other end of the winding. The midpoint of the primary winding of output transformer 26 is grounded to provide the necessary circuit balance.

Figure 3:
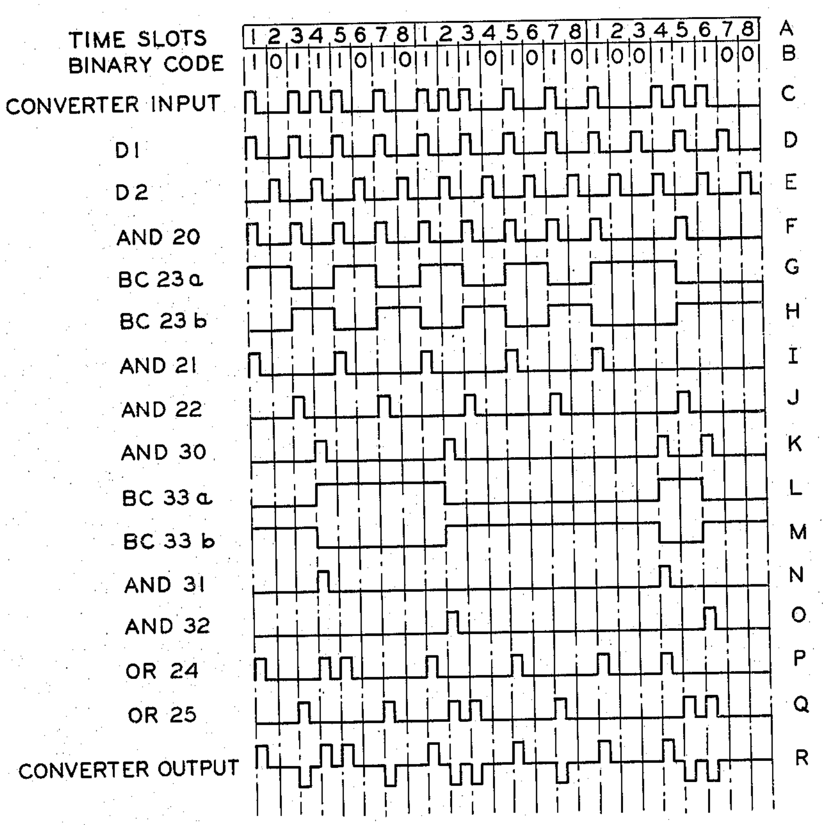
FIG. 3 shows a series of waveforms appearing at various points in the converter of FIG. 2 for different input signals.

The operation of the embodiment of the invention shown in FIG. 2 is illustrated by the waveforms shown in FIG. 3. There, line A indicates the successive time slots for three consecutive code groups and line B gives the conventional binary number representation of three eight-digit code groups used as examples. The waveform of the succession of corresponding unipolar code groups received by input transformer 18 is shown in line C. A fifty percent duty cycle is shown by way of example. The odd and even digit pulses generated by shift register 19 are shown in lines D and E, and the ON and OFF pulses routed to the odd and even conversion channels as a result of the action of AND gates 20 and 30 are shown in lines F and K. As illustrated, each odd-numbered ON or OFF (the presence of a pulse is termed an ON pulse for the sake of convenience and the absence of a pulse is termed an OFF pulse) is routed by AND gate 20 to the odd channel and each even-numbered ON or OFF pulse is routed by AND gate 30 to the even channel. As illustrated in lines G and H of FIG. 3, each ON pulse passed by AND gate 20 reverses the state of binary counter 23. Lines L and M illustrate the similar action of binary counter 33 in response to ON pulses passed by AND gate 30.

In order to reverse the polarity of ON pulses, in accordance with the invention, each conversion channel is further sub-divided by AND gates into two sub-channels. In the odd conversion channel, these are controlled by AND gates 21 and 22. In the even conversion channel, they are controlled by AND gates 31 and 32. From conversion channel, successive ON pulses are routed during their respective time slots into alternate sub-channels, as shown for the odd conversion channel in lines I and J of FIG. 3 and for the even conversion channel in lines N and O. AND gates 21 and 31 are then connected to supply the two input leads to OR gate 24, while AND gates 22 and 32 are connected to supply those to OR gate 25. Along with transformer 26, OR gates 24 and 25 perform the polarity reversal function in the odd and even conversion channels. OR gate 24 receives and passes to one end of the primary of transformer 26 the ON pulses whose polarity is to remain unchanged. OR gate 25, on the other hand, receives and passes to the other end of the primary winding those ON pulses whose polarity is to be reversed. These two pulse trains are shown in lines P and Q, respectively, of FIG. 3. Finally, transformer 26 recombines the two pulse trains, with all ON and OFF pulses retaining their original order, to produce the pseudo-ternary or three-level pulse train shown in line R of FIG. 3 As illustrated, this pulse train has no more than two successive ON pulses of the same polarity at any time.

Still closer examination of FIG. 3 with respect to the embodiment of the invention illustrated in FIG. 2 reveals the following sequence of events for the first of the three code groups used as examples. As shown in lines B and C of FIG. 3, the code group 10111010 is received by input transformer 18. As shown in line F, the original ON and OFF pulses for odd time slots appear at the output of AND gate 20 as 1–1–1–1–, where each "–" represents a zero amplitude guard space taking the place of a pulse routed to the other channel. As shown in line K, those from even time slots, on the other hand, appear at the output of AND gate 30 as –0–1–0–0. Lines J and O of FIG. 3 illustrate the ON pulses selected for inversion by AND gates 22 and 32, respectively. As shown in line J, the pulses appearing at the output of AND gate 22 are – – 1 – – – 1 – and, as shown in line O, those appearing at the output of AND gate 32 are – – – – – – – – (none of the original ON pulses at all, in other words). The pulses not selected for inversion appear at the outputs of AND gates 21 and 31, respectively, as 1– – –1– – – and –0–1–0–0. The original ON and OFF pulses not selected for inversion are passed by OR gate 24 to amplifier 27 and the upper terminal of transformer 26 as 10–110–0, as shown in line P. The ON pulses selected for inversion, on the other hand, are passed by OR gate 25 to amplifier 28 as – –1– – –1–, as shown in line Q, and are inverted by the connection from amplifier 28 to the lower terminal of transformer 26. As may readily be seen by a comparison of lines C and R of FIG. 3, all ON and OFF pulses are then combined in their original sequence by transformer 26. The resulting pseudo-ternary or three-level pulse train is illustrated in line R. The binary sequence of the train remains the original 10111010. The sequence of events for the other two illustrative code groups is similar.

Figure 4:
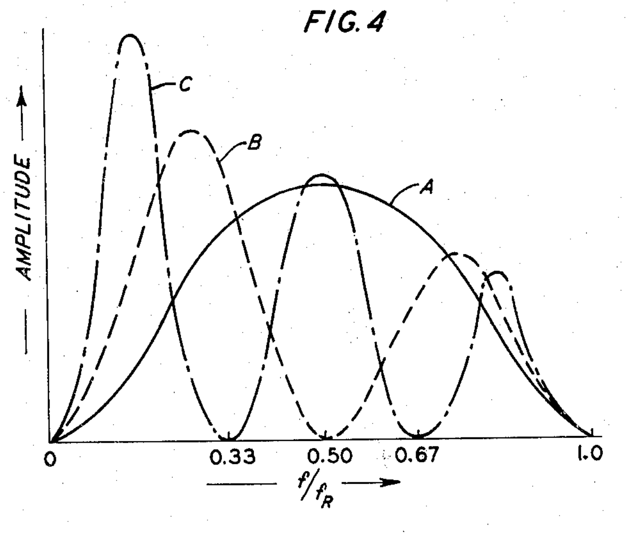
FIG. 4 illustrates the power density spectra afforded by embodiments of the present invention in comparison with one provided by the prior art.

The power density spectrum of the three-level pulse train produced by the embodiment of the invention shown in FIG. 2 is illustrated as curve B in FIG. 4. Curve A in that same figure shows the power density spectrum produced by the prior art three-level code conversion schemes disclosed by Meacham and Andrews. As shown, the latter has nulls at both zero frequency and $f_R$, the bit rate. Such a spectrum avoids problems of direct-current restoration but is likely to encounter an undesirable amount of timing crosstalk if a timing wave having a frequency equal to the bit rate is added. The spectrum provided by the two-channel embodiment of the invention, however, not only retains the null at zero frequency but also provides an additional null at a frequency equal to half the bit rate, as shown by curve B. A timing wave added at this frequency may be recovered easily at repeater points, will not be interfered with by components of the pulse train having the same or similar frequencies, and is much less subject to crosstalk. For timing purposes, it can readily be transformed into the bit rate at repeater points by simple frequency-doubling techniques.

In general, the invention contemplates routing consecutive ON and OFF pulses from the conventional two-level pulse train which is to be converted into $n$ conversion channels in sequence, where $n$ is any integer greater than unity. The greater the number of channels, the lower is the first null above direct current in the power density spectrum of the resulting three-level pulse train. Theoretically at least, the lower the added timing wave can be in frequency, the less is the amount of timing crosstalk that takes place between adjacent lines. As a practical matter, however, the amount of additional crosstalk reduction made possible by an added conversion channel diminishes with each additional channel. If the added timing wave is so reduced in frequency that it approaches direct current, moreover, it is likely to require inordinately large system coupling transformers in order to provide the necessary low-frequency response. Limitation to a relatively small number of conversion channels is, therefore, generally desirable.

Figure 5:
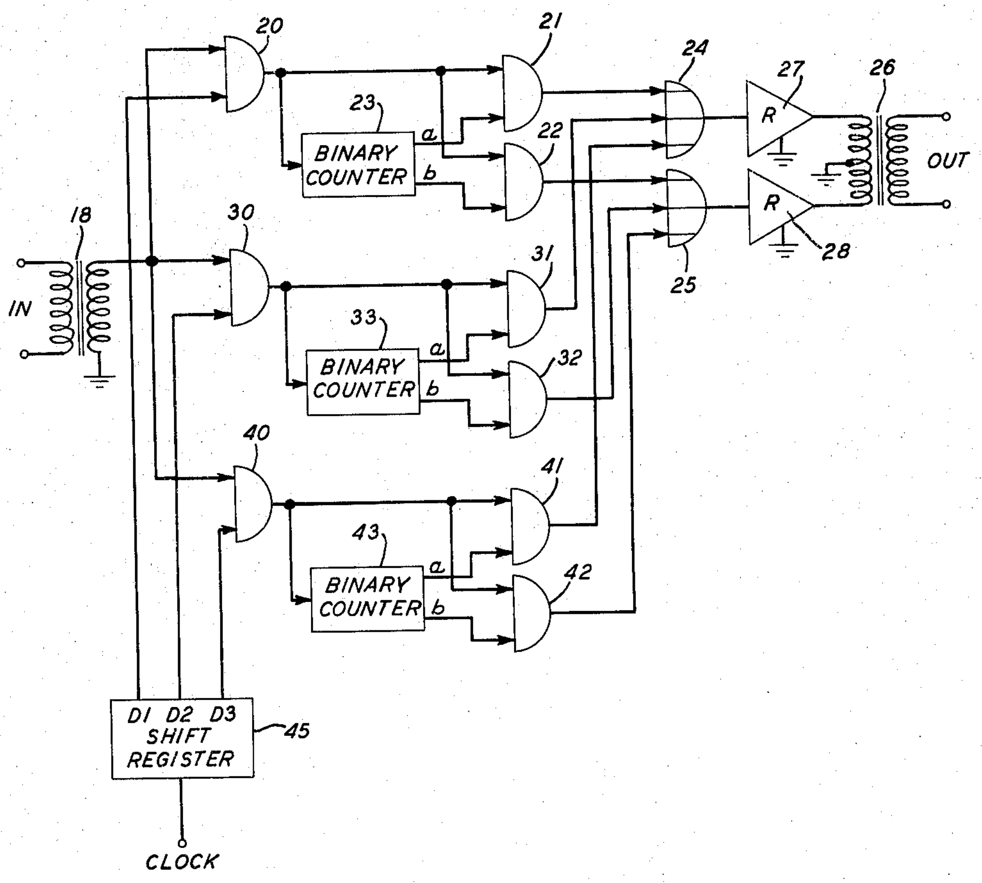
FIG. 5 shows a three-channel code converter embodying the invention.

The embodiment of the invention illustrated in FIG. 5 is generally similar to the one illustrated in FIG. 2 but has three conversion channels instead of two. The third conversion channel includes three AND gates 40, 41, and 42, and a binary counter 43 arranged in the same manner as AND gates 20, 21, and 22, and binary counter 23 in the first channel. The two-stage shift register 19 is replaced in FIG. 5 by a three-stage shift register 45 which supplies timing pulses to AND gates 20, 30, and 40 in sequence. A ring counter may be used as an alternative to shift register 45. OR gates 24 and 25 collect ON and OFF pulses from three conversion sub-channels instead of two. Otherwise, the circuits are the same.

Figure 6:
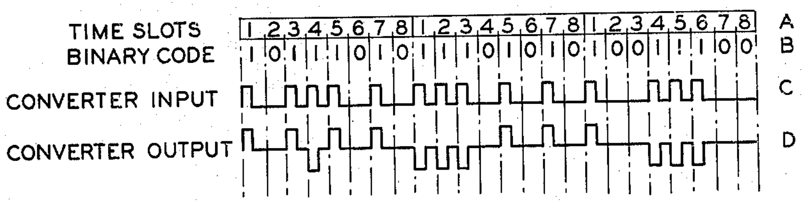
FIG. 6 shows output waveforms provided by the code converter of FIG. 5 in response to different input signals.

Since the operation of the code converter shown in FIG. 5 is generally the same as the operation of the one shown in FIG. 2, it will not be described in detail. The output waveform for the same incoming binary code train shown in FIG. 3, however, appears in line D of FIG. 6. As in FIG. 3, line A indicates the time slots of successive code groups, line B shows the conventional representation of three particular code groups taken by way of example, and line C shows the corresponding unipolar waveform. As illustrated in line D, the resulting three-level pulse train has no more than three consecutive ON pulses of the same polarity at any time.

The power density spectrum of the three-level train provided by the embodiment of the invention shown in FIG. 5 is illustrated as curve C in FIG. 4. As shown, it retains the null at zero frequency and provides additional nulls at frequencies equal to one-third and two-thirds of the bit rate. A timing wave added at one-third of the bit rate may be recovered easily at repeater points and is even less subject to crosstalk than one added at half the bit rate. It is still high enough in frequency, however, to avoid imposing severe requirements upon coupling transformers in the system.

It is to be understood that the above-described arrangements are illustrative of the application of the principles of the invention. Numerous other arrangements may be devised by those skilled in the art without departing from the spirit and scope of the invention.

What is claimed is:

1. Apparatus for converting a two-valued binary code train of ON and OFF pulses having a basic pulse repetition frequency and a power density spectrum with discrete components at zero frequency and at said basic pulse repetition frequency and with a substantial continuous component at both zero frequency and said basic pulse repetition frequency, where said ON and OFF pulses are respectively different energy levels and all of said ON pulses have the same polarity with respect to said OFF pulses, into a three-valued pulse train having a power density spectrum with no discrete components and with a continuous component which has nulls at zero frequency, said basic pulse repetition frequency, and half said basic pulse repetition frequency which comprises a pair of separate conversion channels, means for routing consecutive pulses of said two-valued binary code train into alternate ones of said conversion channels in sequence, means for inverting with respect to the OFF pulses the polarity of alternate ON pulses in each of said channels while leaving the OFF pulses substantially undisturbed, and means for combining pulses from both of said channels in their original sequence.

2. Apparatus for converting a two-valued binary code train of ON and OFF pulses having a basic pulse repetition frequency and a power density spectrum with discrete components at zero frequency and at said basic pulse repetition frequency and with a substantial continuous component at both zero frequency and said basic pulse repetition frequency, where said ON and OFF pulses are respectively different energy levels and all of said ON pulses have the same polarity with respect to said OFF pulses, into a three-valued pulse train having a power density spectrum with no discrete components and with a continuous component which has nulls at zero frequency, said basic pulse repetition frequency, and at least one submultiple of said basic pulse repetition frequency which comprises a plurality of separate conversion channels, means for routing consecutive pulses of said two-valued binary code train into successively different ones of said conversion channels in sequence, means for inverting with respect to the OFF pulses the polarity of alternate ON pulses in each of said channels while leaving the OFF pulses substantially undisturbed, and means for combining pulses from all of said channels in their original sequence.

3. Apparatus for converting a two-valued binary code train of ON and OFF pulses having a basic pulse repetition frequency and a power density spectrum with discrete components at zero frequency and at said basic pulse repetition frequency and with a substantial continuous component at both zero frequency and said basic pulse repetition frequency, where said ON and OFF pulses are respectively different energy levels and all of said ON pulses have the same polarity with respect to said OFF pulses, into a three-valued pulse train having a power density spectrum with no discrete components and with a continuous component which has nulls at zero frequency, said basic pulse repetition frequency, and half said basic pulse repetition frequency which comprises a pair of separate conversion channels, means for routing consecutive pulses of said two-valued binary code train into alternate ones of said conversion channels in sequence, a pair of sub-channels for each of said conversion channels, means for routing consecutive ON pulses from each of said conversion channels into one or the other of the associated sub-channels in alternation, means for combining pulses from one of both of said pairs of sub-channels in their original sequence to form a first sub-train, means for combining pulses from the other of both of said pairs of sub-channels in their original sequence to form a second sub-train, and means for combining said first and second sub-trains in phase opposition to each other.

4. Apparatus for converting a two-valued binary code train of ON and OFF pulses having a basic pulse repetition frequency and a power density spectrum with discrete components at zero frequency and at said basic pulse repetition frequency and with a substantial continuous component at both zero frequency and said basic pulse repetition frequency, where said ON and OFF pulses are respectively different energy levels and all of said ON pulses have the same polarity with respect to said OFF pulses, into a three-valued pulse train having a power density spectrum with no discrete components and with a continuous component which has nulls at zero frequency, said basic pulse repetition frequency, and at least one submultiple of said basic pulse repetition frequency which comprises a plurality of separate conversion channels, means for routing consecutive pulses of said two-valued binary code train into successively different ones of said conversion channels in sequence, a pair of sub-channels for each of said conversion channels, means for routing consecutive ON pulses from each of said conversion channels into one or the other of the associated sub-channels in alternation, means for combining pulses from one of each of said pairs of sub-channels in their original sequence to form a first sub-train, means for combining pulses from the other of each of said pairs of sub-channels in their original sequence to form a second sub-train, and means for combining said first and second sub-trains in phase opposition to each other.

References Cited by the Examiner

UNITED STATES PATENTS

| | | | |
|---|---|---|---|
| 2,046,964 | 7/36 | Nelson | 178—26 |
| 2,141,237 | 12/38 | Connery | 178—26 |
| 2,700,696 | 1/55 | Barker | 340—347 |
| 2,759,047 | 8/56 | Meacham | 325—42 |
| 2,996,578 | 8/61 | Andrews | 178—70 |

MALCOLM A. MORRISON, *Primary Examiner.*

IRVING L. SRAGOW, STEPHEN W. CAPELLI, *Examiners.*